US005336302A

United States Patent [19]

Bondurant

[11] Patent Number: 5,336,302

[45] **Date of Patent: * Aug. 9, 1994**

[54] NON-ALCOHOL FOUNTAIN SOLUTIONS

[76] Inventor: Louis E. Bondurant, P.O. Box 2074, Middleburg, Va. 22117

[ * ] Notice: The portion of the term of this patent subsequent to Dec. 7, 2010 has been disclaimed.

[21] Appl. No.: 28,819

[22] Filed: Mar. 10, 1993

Related U.S. Application Data

[63] Continuation-in-part of Ser. No. 846,567, Mar. 5, 1992.

[51] Int. Cl.[5] .......... C09K 3/18

[52] U.S. Cl. .......... 106/2; 101/451

[58] Field of Search .......... 106/2; 101/451

[56] References Cited

U.S. PATENT DOCUMENTS

| | | | |
|---|---|---|---|
| 3,687,694 | 8/1972 | Van Dusen, Jr. | 106/2 |
| 4,374,036 | 2/1983 | Canale et al. | 106/2 |
| 4,764,213 | 8/1988 | Gventer et al. | 106/2 |
| 4,865,646 | 9/1989 | Egberg | 106/2 |

*Primary Examiner*—Helene Klemanski
*Attorney, Agent, or Firm*—Raymond N. Baker

[57] ABSTRACT

Low temperature flash-point alcohols are supplanted in fountain solutions for use in offset planographic printing by a high temperature flash-point amine which enables continued use of existing printing plates and printing materials while taking into consideration environmental concerns. An amine, such as N-methyl pyrrolidine, is selected and combined in an aqueous solution of a buffer such as monopotassium phosphate, a humectant such as glycerin, and an emulsifying and coupling agent such as ethylene glycol monobutyl ether. A desensitizing agent such as gum arabic is preferably added; and an inert food coloring can be added, with the balance water.

7 Claims, No Drawings

NON-ALCOHOL FOUNTAIN SOLUTIONS

This application is a continuation-in-part of application Ser. No. 07/846,567 filed Mar. 5, 1992.

The present invention relates to novel fountain solutions for use in offset planographic printing, which have been modified to take into consideration factors subject to increasing environmental regulation without sacrificing performance in printing operations, and which are compatible with virtually all types of existing planographic printing plates and printing materials. More specifically, this invention is concerned with non-alcohol fountain solutions.

Planographic printing involves continuous coaction of press roll means with a cylinder-mounted printing plate during printing operations. Metal surfaces of the fountain solution (moisturizing) system transfer fountain solution to water-receptive nonprint areas of the printing plate. An ink roller transfers ink to water-repellent ink-receptive print areas of the printing plate, and the printing plate transfers ink and moisture to the blanket cylinder for offset printing operations.

The "fountain solution system" carries out moisturizing functions. For example, metal and rubber transfer surfaces of the "fountain solution system" are for proper transfer of moisture to the water-receptive nonprint areas of the printing plate and, subsequently, to the blanket cylinder. Thus, fountain solution plays an important role in helping to avoid or solve problems associated with moisturizing functions and with achieving the compatibility of printing plates and materials which make printing operations more efficient and help to maintain printing quality.

The moistening, inking and transfer functions are successively repeated for the production of large numbers of copies. Stock fountain solutions, such as those disclosed in U.S. Pat. No. 3,398,002, have contained as much as 25%, by weight, of low flash-point alcohol. Such relatively high percentages of a low flash-point alcohol additionally tends to facilitate release of vapors from other constituents, such as ethylene glycol.

Objectives of the present invention are to diminish concerns with handling, storage and use of chemical solutions for offset printing operations by supplanting alcohol in fountain solutions for use in planographic printing presses without sacrifice of fountain solution performance, printing efficiency or quality; to provide: the ability to resist contamination of the fountain solution caused, for example, by alkaline paper, and the ability to emulsify stray specks of ink, which tend to occur in the fountain solution during the above-mentioned transfer functions; and, further, to provide for improved miscibility of fountain solution constituents.

The novel fountain solutions of the present invention help to maintain desired surface moisturized conditions during printing operations while providing for use of a high flash-point amine in the fountain solution, rather than the low flash-point alcohols which have been used in the past. For example, isopropyl alcohol, which generally has been used in fountain solutions, can have a flash point of less than about 70° F. (about 50° F. to 70° F.), while a preferred amine of the present invention, such as N-methyl pyrrolidine, exhibits a flash point above 240° F.

The novel non-alcohol fountain solutions of the present invention are compatible with existing types of planographic printing plates, including direct-image plates, photo-direct plates, metal plates, fiber plates, and "Ektalith" plates; and do not require special handling, special inks, special press adjustments, or other modifications of the printing process due to use of non-alcohol fountain solutions.

The formulation of the stock fountain solutions is based upon an aqueous stock solution including (a) about 1 to 25% by weight of a buffer selected from the group comprising a monobasic alkali metal phosphate (such as monopotassium phosphate or monosodium phosphate), or monoammonium phosphate, or monopotassium citrate; (b) about 1 to about 30% by weight humectant selected from the group comprising ethylene glycol, glycerin, propylene glycol or sorbitol; (c) about 1 to about 15% of an emulsifying and coupling agent selected from the group comprising ethylene glycol monobutyl ether, ethylene glycol N-butyl ether and propylene glycol butyl ether and (d) an amine (supplanting the alcohol) selected from the group comprising N-methyl pyrrolidine, trimethylamine, or triethylamine.

A trace amount (about 0.2 to about 0.5% by weight) of phosphoric, lactic or citric acid can be added to stabilize the pH for operations within a range of 2 to 7; with the range for the stock solution preferably being about 3.5 to about 4.5. About 0.1% to about 4% of a surface desensitizer, such as gum arabic, is preferably added to help desensitize moisture transfer surfaces. And the balance is water which is distilled, deionized or of sufficiently low electrolyte content so as not to interfere with printing operations.

Also, an inert food coloring can be added for coloring the solution in accordance with marketing preference. As an example, Alkali Fast Green and Tartrazine Yellow can be combined to provide a desired light green color to signify a non-alcohol fountain solution.

In preparing fountain solutions of the invention, it is preferred that the selected buffer be first added to the water and thoroughly mixed. After mixing the buffer and water, the remaining liquid ingredients are selected, added and thoroughly mixed. The stock solutions set forth are diluted with water prior to use for printing operations; a ratio of one part stock solution to about ten parts water is acceptable for printing operations.

In the following example, all parts are in terms of percent by weight:

| EXAMPLE I | |
|---|---|
| Monopotassium phosphate | 2.00% |
| N-Methyl pyrrolidine | 7.00% |
| Glycerin | 12.00% |
| Phosphoric Acid | 0.20% |
| Alkali Fast Green | 0.05% |
| Tartrazine Yellow | 0.01% |
| Balance water | |

The stock solution of Example I is diluted in the ratio of one part stock solution to seven parts water for use in the fountain of a press for printing operations.

Ranges of operable concentrations of the solution constituents are set forth in a number of following examples. Example II presents low concentrations of the constituents; all percentages are by weight.

| EXAMPLE II | |
|---|---|
| Monopotassium phosphate | 0.10% |
| N-Methyl pyrrolidine | 1.00% |

-continued

| EXAMPLE II | |
|---|---|
| Glycerin | 2.00% |
| Ethylene glycol monobutyl ether | 1.00% |
| Phosphoric acid | 0.20% |
| Gum Arabic | 0.05% |
| Balance water | |

Increased constituents are present in the following examples, such as Example III with increased amine, and Example IV with increased humectant. Example IV shows a maximum percentage for the humectant of the stock solution. Example V is illustrative of the maximum percentage of the preferred emulsifying and coupling agent, ethylene glycol monobutyl ether. Example VI shows the use of a maximum percentage of a buffer.

| | |
|---|---|
| EXAMPLE III | |
| Monopotassium phosphate | 1.00% |
| N-Methyl pyrrolidine | 25.00% |
| Glycerin | 5.00% |
| Ethylene glycol monobutyl ether | 3.00% |
| Phosphoric acid | 0.20% |
| Gum Arabic | 4.00% |
| Balance water | |
| EXAMPLE IV | |
| Monopotassium phosphate | 1.00% |
| N-Methyl pyrrolidine | 2.00% |
| Glycerin | 30.00% |
| Ethylene glycol monobutyl ether | 1.00% |
| Phosphoric acid | 0.20% |
| Gum Arabic | 4.00% |
| Balance water | |
| EXAMPLE V | |
| Monopotassium phosphate | 1.00% |
| N-Methyl pyrrolidine | 2.00% |
| Glycerin | 2.00% |
| Ethylene glycol monobutyl ether | 25.00% |
| Phosphoric acid | 0.20% |
| Alkali Fast Green 2G | 0.05% |
| Tartrazine Yellow | 0.01% |
| Balance water | |
| EXAMPLE VI | |
| Monopotassium phosphate | 10.00% |
| N-Methyl pyrrolidine | 7.00% |
| Glycerin | 2.00% |
| Ethylene glycol monobutyl ether | 5.00% |
| Phosphoric acid, 85% | 0.20% |
| Gum Arabic | 2.00% |
| Balance water | |
| EXAMPLE VII | |
| Monosodium phosphate | 2.00% |
| N-Methyl pyrrolidine | 7.00% |
| Glycerin | 12.00% |
| Ethylene glycol monobutyl ether | 8.00% |
| Gum Arabic | 4.00% |
| Balance water | |
| EXAMPLE VIII | |
| Monoammonium phosphate | 2.00% |
| N-Methyl pyrrolidine | 7.00% |
| Glycerin | 12.00% |
| Ethylene glycol n-butyl ether | 8.00% |
| Gum Arabic | 4.00% |
| Balance water | |

Examples VII and VIII are illustrative of the substitution of monosodium phosphate and monoammonium phosphate for monopotassium phosphate as the buffer. These examples also include gum arabic to help desensitize water transfer surfaces.

Alkali Fast Green at approximately 0.05% by weight and Tartrazine Yellow at approximately 0.01% by weight provide a light green color to the solution, signifying a non-alcohol fountain solution.

Variations may also be made in the range of dilution of the stock solution with water for printing operations. It has been found that acceptable ranges of dilution are from one part stock solution to one part water, to one part stock solution to about twenty-five parts water. For printing operations it is preferred that the dilution water be as described for the stock solution; that is, distilled, deionized or sufficiently low in electrolytes so as not to disturb printing operations.

Non-alcohol fountain solutions providing for desired printing quality with existing press and printing plate equipment, and compatible with printing materials such as soybean ink, can be formulated in the following ranges by weight:

| Constituent | Percent Range |
|---|---|
| Buffer<br>selected from:<br>monopotassium phosphate,<br>monosodium phosphate, mono-<br>ammonium phosphate, mono-<br>potassium citrate, or<br>mixtures thereof; | about 1-25% |
| Acid<br>selected from:<br>phosphoric, lactic or<br>citric acid | about 0.5% |
| Amine<br>selected from:<br>N-methyl pyrrolidine, tri-<br>ethylamine, or trimethylamine | about 1-25% |
| Humectant<br>selected from:<br>ethylene glycol, glycerin,<br>sorbitol, propylene glycol,<br>or mixtures thereof (decreasing<br>percent of ethylene glycol is<br>preferred); | about 1-30% |
| Emulsifying and coupling agent<br>selected from:<br>Ethylene glycol monobutyl ether,<br>propylene glycol butyl ether,<br>ethylene glycol n-butyl ether; | about 1-15% |
| Balance - water | |

About 0.1 to about 4% by weight desensitizing agent, such as gum arabic, is preferably added as a desensitizing agent. Inert food coloring can be added to colorize the stock solution to preference.

The foregoing teachings enable elimination of low flash point alcohol from fountain solutions for offset planographic printing operations, while accommodating various existing printing plates and materials.

It should be recognized, however, that variations from the embodiments specifically set forth can be made by those skilled in the art in light of the above teachings; therefore, in determining the scope of the present invention, reference shall be made to the appended claims.

What is claimed is:

1. A non-alcohol aqueous stock fountain solution for use in planographic printing, comprising by weight about 1 to 25% of a buffer selected from the group consisting of monopotassium phosphate, monosodium phosphate, monoammonium phosphate, and monopotassium citrate, about 1 to 25% of an amine selected from the group consisting of trimethylamine, triethylamine and N-methyl pyrrolidine, about 1–30% of a humectant selected from the group consisting of ethylene glycol, glycerin, propylene glycol and sorbitol, about 1 to 15% of an emulsifying and coupling agent selected from the group consisting of ethylene glycol monobutyl ether, ethylene glycol N-butyl ether and propylene glycol butyl ether, and the balance water.

2. A non-alcohol stock fountain solution which is diluted with water for use in offset planographic printing, comprising:

a buffer, a humectant, an emulsifying and coupling agent, and an amine selected from the group consisting of N-methyl pyrrolidine, triethylamine, and trimethylamine.

3. The stock fountain solution of claim 2, including about 0.2 to about 0.5% by weight of an acid, selected from the group consisting of phosphoric, lactic and citric acid for stabilizing the pH of the stock solution in the range of about 3.5 to 4.5.

4. The stock fountain solution of claim 2, further including a desensitizing agent in the amount of about 0.1 to about 4% by weight.

5. The stock fountain solution of claim 2 in which:

the buffer is selected from the group consisting of monopotassium phosphate, monoammonium phosphate, monosodium phosphate and monopotassium citrate in the amount of about 2% by weight;

the amine is selected from the group consisting of N-methyl pyrrolidine, triethylamine and trimethylamine in the amount of about 7% by weight;

the humectant is selected from the group consisting of ethylene glycol, glycerin, sorbitol and propylene glycol in the amount of about 12% by weight; and the emulsifying and coupling agent is selected from the group consisting of ethylene glycol monobutyl ether, ethylene glycol n-butyl ether and propylene glycol butyl ether in the amount of about 8% by weight.

6. The stock fountain solution of claim 3, further including an inert food coloring, and the balance water.

7. A non-alcohol aqueous stock fountain solution for use in planographic printing, comprising by weight about 1 to 25% of a buffer selected from the group consisting of monopotassium phosphate, monosodium phosphate, monoammonium phosphate, and monopotassium citrate, about 1 to 25% of an amine selected from the group consisting of trimethylamine, triethylamine and N-methyl pyrrolidine, about 1–30% of a humectant selected from the group consisting of ethylene glycol, glycerin, propylene glycol and sorbitol, about 1 to 15% of an emulsifying and coupling agent selected from the group consisting of ethylene glycol monobutyl ether, ethylene glycol n-butyl ether, propylene glycol butyl ether, about 0.1 to 4% gum arabic, and a trace amount of acid selected from the group consisting of phosphoric, lactic and citric acid, for stabilizing the pH in the range of about 2 to 7 during printing operations.

* * * * *